April 24, 1934. G. W. BOOTH 1,956,209
METHOD OF CAPPING CONTAINERS AND PRODUCT THEREOF
Original Filed July 27, 1931    5 Sheets-Sheet 1

Inventor
George W. Booth,
By [signature]
Attorneys

April 24, 1934.　　　　　G. W. BOOTH　　　　　1,956,209
METHOD OF CAPPING CONTAINERS AND PRODUCT THEREOF
Original Filed July 27, 1931　　5 Sheets-Sheet 2

Inventor
George W. Booth
By Cushman Bryant Darby & Cushman
Attorneys

April 24, 1934. G. W. BOOTH 1,956,209
METHOD OF CAPPING CONTAINERS AND PRODUCT THEREOF
Original Filed July 27, 1931 5 Sheets-Sheet 3

Inventor
George W. Booth
By Cushman, Bryant, Darby & Cushman
Attorneys

April 24, 1934.  G. W. BOOTH  1,956,209

METHOD OF CAPPING CONTAINERS AND PRODUCT THEREOF

Original Filed July 27, 1931  5 Sheets-Sheet 5

Inventor
George W. Booth

Patented Apr. 24, 1934

1,956,209

UNITED STATES PATENT OFFICE 1,956,209

METHOD OF CAPPING CONTAINERS AND PRODUCT THEREOF

George W. Booth, Baltimore, Md., assignor to Crown Cork & Seal Company, Inc., Baltimore, Md., a corporation of New York Application July 27, 1931, Serial No. 553,464
Renewed September 12, 1933

32 Claims. (Cl. 226—83)

The present invention relates to an improved method for capping containers, and more particularly to an improved method for applying closures to containers of the type provided around the container mouth or neck with a finish in the form of a bead or shoulder with which the closure may be engaged to lock the same in position.

Although the method may be employed with closures of various types, I will describe the same in connection with the closure disclosed in my copending application Serial No. 702,263 filed December 13, 1933, as a continuation of my original application, Serial No. 553,463, filed July 27, 1931, and in connection with a preferred mechanism for the practice of the method disclosed in my copending application, Serial No. 553,462, filed July 27, 1931.

The method is particularly adapted for the capping of containers for milk, and an object of the invention is to provide a method which is simple and inexpensive and which will provide a more effective sealing engagement between the cap and container than has heretofore been obtainable.

Another object of the invention is to provide a method which will enable the cap to be formed upon the container, thereby causing the same to conform to any irregularities or variations in the dimensions of the container.

A still further object is to enable a closure of given dimensions to be utilized with containers which vary considerably in shape and dimensions, and which will afford a more extended area of sealing engagement than has heretofore been possible.

The invention relates to the type of seal in which a closure of larger area than the overall area of the container mouth has a depending skirt which interlocks with the shoulder or bead forming the finish around the container mouth. Heretofore, closures of this type have been preformed to the extent of providing the same with a fluted or crimped skirt which flares outwardly from a top, and it has been customary to deform the skirt by means of a capping machine having a deforming throat. Engagement of the throat with the flaring, crimped skirt causes the inward corrugations to pass beneath and engage the locking bead or finish about the bottle mouth. In caps of this type, it has heretofore been customary to rely upon the engagement of an interior liner with merely the top of the vessel mouth to provide a seal, the interlocking of the crimps on the skirt with the bead serving to compress a disc or ring of cushion material and effect a sealing engagement thereof with the top of the bead or the lip on the container.

In other forms of this type of closure, the cap has been provided with a substantially vertical or cylindrical skirt and the lower edge of the skirt has been forced below the container locking bead or finish by spinning operation.

As distinguished from these methods of capping, the present invention involves the formation of part at least of the skirt, in situ, i. e., upon the container, and in such a way that the ductile material of the cap is ironed or drawn over the finish or bead by direct application of pressure over the container bead. This pressure is preferably applied beginning inwardly from the closure margin at points uniformly disposed around the container, and is progressively applied outwardly toward the margin or edge of the closure, while extending the same downwardly over the bottle finish. This ironing action causes the skirt to conform to the container not only under the ironed surface, but also thereabove, since the ironing tends to draw the metal above the surface, as well as immediately under the ironing tool and to conform the metal thereabove closely to the container surface. The ironing pressure is continued until the ironing or drawing of the metal causes the free edge or margin to buckle freely beneath the shoulder or bead to produce a crimped edge which results entirely from the ironing or drawing action.

In practicing the method, it is preferred that the free edge of the closure be supported during the ironing or drawing operation, thereby preventing a bodily bending of the margin of the closure and causing the same to conform progressively to the container as the ironing operation is continued from points nearer the center of the closure outwardly toward its edge.

There is thus obtained an accurate forming of the closure to any irregularities or dimensional variations, and there is produced a sealing engagement not only along a narrow line extending over the top of the container mouth as in the preformed type of closure heretofore utilized, but a close fit and sealing engagement throughout substantially the entire surface of the finish from the top downwardly and outward to the plane in its greatest dimension.

These general characteristics of the method will become clearer as the description proceeds in connection with a preferred form of the same disclosed in the accompanying drawings, wherein.

The method contemplates the use of a closure having a marginal portion which is uncrimped and which preferably lies in substantially the plane of the body of the closure or in a plane substantially parallel therewith, as distinguished from a preformed closure having a completely depending skirt which is crimped or fluted. In other words, the closure is a substantially flat disc. By "disc" is meant a body of any outline (whether circular, triangular or square), since the contour of the closure may vary considerably and is not material to the invention.

Closures of suitable forms are disclosed in the copending application, above referred to, and a number of forms are shown in Figures 13 to 17, inclusive.

Figure 13:
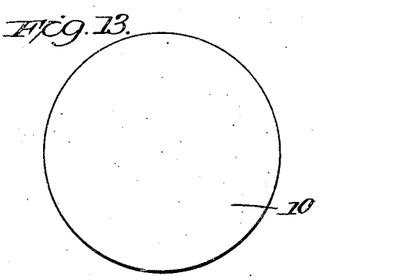
Figure 13 is a plan view of a closure.
Figure 14:
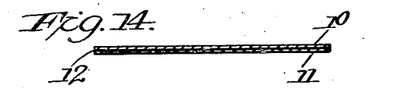
Figure 14 is an edge view of the closure shown in Figure 14.

Referring to Figures 13 and 14, it will be seen that the closure constitutes a complete article of manufacture which is substantially flat and may be termed a disc. It is of the type intended for a container having around its mouth a bead or shoulder formation, and consequently it is essential that the area of the disc be greater than the overall area of the mouth of the container to which it is to be applied. The body 10 of the disc is of thin ductile material, such as sheet metal, and it is simply essential that the material be of such character that, when the skirt is formed, the free edge or marginal portion will, under the pressure applied around the mouth of a container as hereinafter described, buckle beneath the bead or shoulder and securely lock the cap upon the container.

It is preferred that at least one surface of the body be provided with a facing 11 which is resistant to liquid or other contents of the container and if a plastic or fluid facing is not desired, suitable parchment or other cellulosic material may be used, the same being treated, if necessary, to make the same substantially impervious to the liquid contents of the container. Metal foil may be employed and for some purposes sheets of resilient material such as rubber compounds or composition cork may be applied to the ductile body.

If a facing of sheet form is employed, it is preferred to securely bond the same to the surface of the body by a suitable adhesive stratum 12 and any desired adhesive commonly used in the closure art may be employed, such as gutta percha or other liquid resistant adhesive.

As illustrated in Figure 14, the closure comprises two plies 10, 11, and an interposed adhesive stratum 12 is used when the facing ply is applied in sheet form.

The ductile body imparts the rigidity necessary for handling and to provide protection to the container contents, although its marginal portion may be readily deformed from its normal substantially flat form by capping mechanism adapted to apply closures of paper or other thin material.

Figure 15:
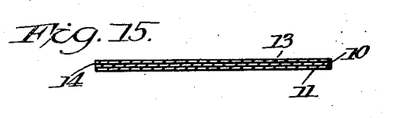
Figure 15 is an edge view of the modified form of closure.

If desired, both surfaces of the ductile body may be coated as illustrated in Figure 15, wherein the exposed or upper surface of the body 10 is provided with a facing 13 adhesively united to the ductile body by an adhesive layer 14. The facing on one or both surfaces of the body affords a sanitary contact surface, and compressible paper or similar material may be employed to afford a somewhat compressible medium which improves the sealing contact.

In some instances it may be desired to decorate the exterior surface and either the exposed metal surface of Figures 13 and 14 may be decorated with advertising or other matter, or the coated surface 13 of Figure 15 may be similarly treated. A cap of this type offers many advantages both in application to a container and from a manufacturing standpoint.

Figure 4:
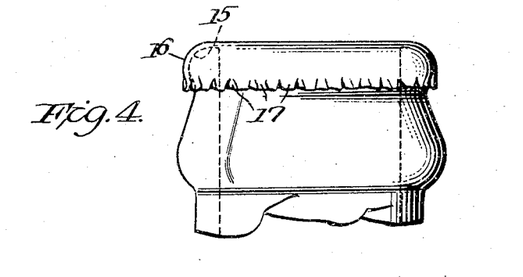
Figure 4 is an elevational view showing the closure fully applied.
Figure 5:
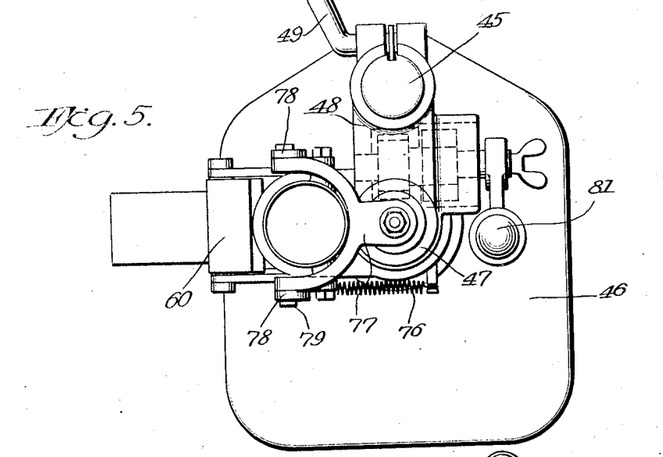
Figure 5 is a plan view of a capping machine for practicing the method.

In Figure 4 the cap is shown as applied to a container having the usual shoulder formed beneath bead 15 surrounding its mouth and as will be observed, the marginal portion 16 closely fits over and surrounds the surface of this bead from its top portion outwardly and downwardly beneath the bead wall. The crimps or corrugations 17 in the margin of the deformed disc securely lock the closure upon the container, and these crimps are to be distinguished from the conventional corrugations of flutes which are preformed in the skirt or a cap of the usual crown type since they differ both in construction and mode of formation, as will be clear from a description of the method of applying the closure to a container which is illustrated in Figures 1, 2 and 3.

Figures 1, 2, 3:
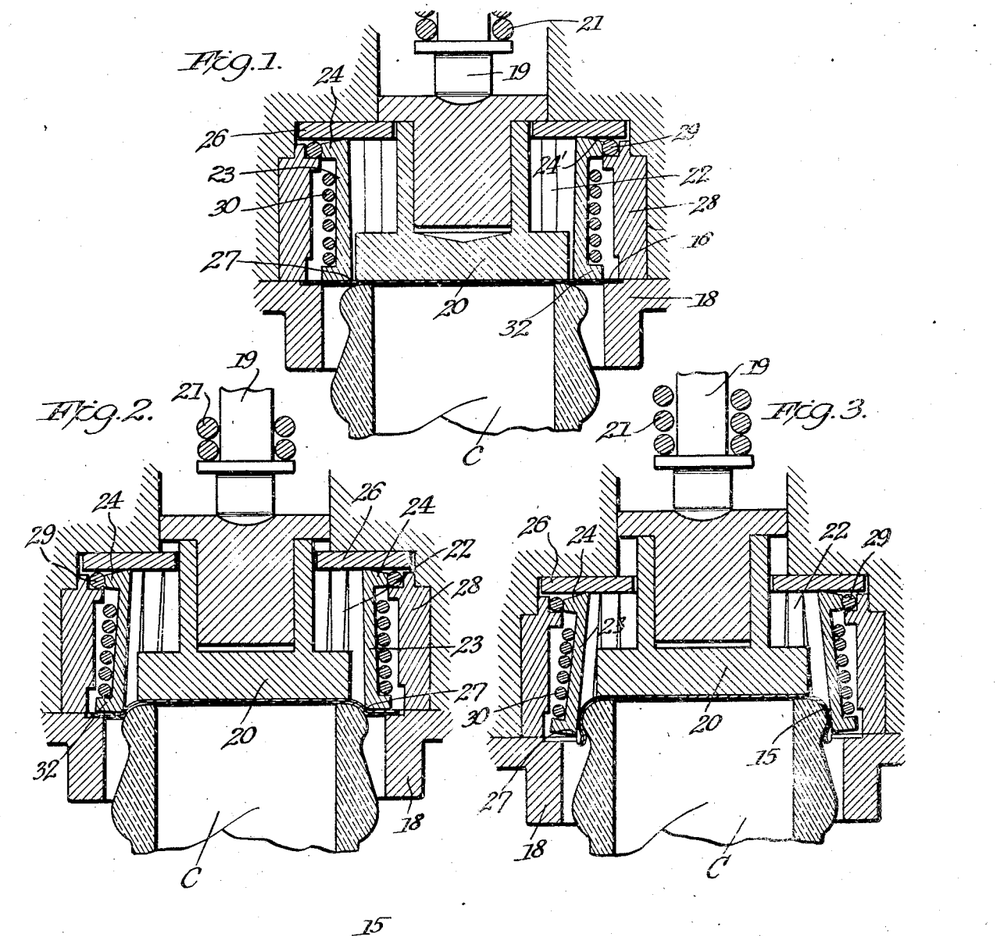
Figure 1 is a sectional view showing the first step in applying the closure to a container.
Figure 2 is a view similar to Figure 1 illustrating a further step in the application of the closure.
Figure 3 is a view similar to Figure 1 showing the final step in the application of the closure.

Referring to Figure 1, the closure is shown as positioned above a container C with its marginal portion 16 supported as by means of a surrounding guide or annulus 18. Inwardly from the marginal portion, the cap is placed under pressure, as by means of a spindle 19 having a presser tool 20 forced downwardly against the cap and container by means of a spring 21 surrounding the spindle. This pressure insures a proper centering of the disc upon the container and a close contact between the undersurface of the disc and the top surface of the bottle lip.

While held under pressure the portion of the disc between its marginal portion 16 and the presser tool 20 is uniformly drawn downwardly or ironed over the curved surface of the locking bead as illustrated in Figure 2. The radial width of the disc which is ironed, will depend, of course, upon the diameter of the throat as compared to the diameter of the container and as illustrated in Figures 1 to 3, inclusive, the throat is normally of substantially less diameter than the container so that the ironing action extends over substantially the entire curved surface of the bead or finish. As will be understood, the ironing action produces a conformation of the bead surface not only under the surface directly engaged by the ironing throat, but also thereabove, since the metal above the directly engaged surface is drawn into close engagement with the bead surface. Obviously, the radial width or area which is ironed may be varied considerably, it being essential only to draw the metal by the engaging or ironing action sufficiently in a direction radially or outwardly of the cap (in a downward direction as disposed upon the container) to effect this drawing action and it is only essential to continue it sufficiently to effect the subsequent buckling action. Consequently, when I refer throughout the specification and claims to the ironing of the cap over the container surface or lip, it will be understood that I do not intend to limit myself to an ironing over the complete or entire lip, since the degree or extent of ironing action does not affect the principle involved so long as it is carried to an extent sufficient (a) to draw the metal into conformity with the container lip and (b) to produce the free buckling action herein described. During this operation, it is preferred to continue supporting the marginal portion or edge 16 of the closure, thereby insuring a gradual or progressive deflection of the closure along the surface of the container bead as distinguished from a bodily bending of the same from the point of initial application of pressure outwardly to its edge. As before stated, the point or line of initial application of pressure may be varied and will depend upon the diameter of the throat as compared to the diameter of the container and cap.

This ironing and drawing of the metal to form a closure skirt in situ may be accomplished by means of a bending throat 22 surrounding the presser tool 20. The throat is formed of a plurality of segmental strips 23 each having at its upper end an outwardly directed flange 24, the top beveled surface 24' of which bears against a flat follower plate 26. Relative movement of the plate 26 and container toward one another forces the lower edge 27 of each segment against the closure to draw the metal thereof downwardly and iron the same over the surface of the bead.

The several segments are supported at their upper ends within the housing 28 by means of a ring 29 against which the outer edge of each flange 24 has a fulcrum bearing and an encircling coil spring 30 yieldingly holds all of the segments in contacting engagement with each other at their tops while permitting relative movement between such segments and separation thereof below ring 29 during the operation of applying the closure to a container. At the lower end, each segment has a sharp bending edge 27 and a flange 32 spaced slightly from the housing or casing 28 a sufficient distance to permit a limited expansion of the throat adjacent the bottom thereof. As will be observed, the segments have a slight longitudinal taper with longitudinally flat inner surfaces so that the diameter of the lower end of the throat is less than that of the upper end. This minimizes the contact between the inner surfaces of the segments and the cap with the result that substantially the entire ironing action is produced by the edges 27. The area or extent of the direct engagement of the ironing throat with the cap may be varied as desired and will depend upon the relation of the diameter of the throat to the diameter of the container and disc.

Relative movement between the container and the bending throat, while pressure is maintained against the closure by means of the presser tool and while the marginal portion of the disc is supported by the guide annulus 18, may be effected either by moving the container upwardly or moving the throat downwardly and relative movement is permitted by the yielding of spring 29 which permits the presser tool 20 to move upwardly within the bending throat.

In Figure 3 the final position of the closure is illustrated and as will be understood, the relative movement between the throat and closure results in the progressive ironing and drawing of the metal of the closure outwardly and downwardly toward the edge of the closure until the free marginal portion is disengaged from the support 18. Under the drawing and ironing action this free edge or marginal portion buckles inwardly, as illustrated in Figure 3, beneath the bead or shoulder of the container.

This buckling action produces the crimps or corrugations shown most clearly in Figure 4 and the same will at all times be maintained free of engagement with the ironing and bending throat which does not move inwardly beneath the shoulder, but has its edge 27 and inner surface in contact only with the portion of the bead above and down to the horizontal plane of its greatest radius.

It will be apparent, therefore, that the flat marginal portion of the cap will buckle and crimp beneath the bead or finish of a container simply by applying bending and drawing pressure around the container mouth inwardly from the margin of the closure, and that the formation of the skirt in situ or upon the container automatically produces the buckling of the free edge or marginal portion of the closure and the locking of the formed closure in position.

Figure 20:
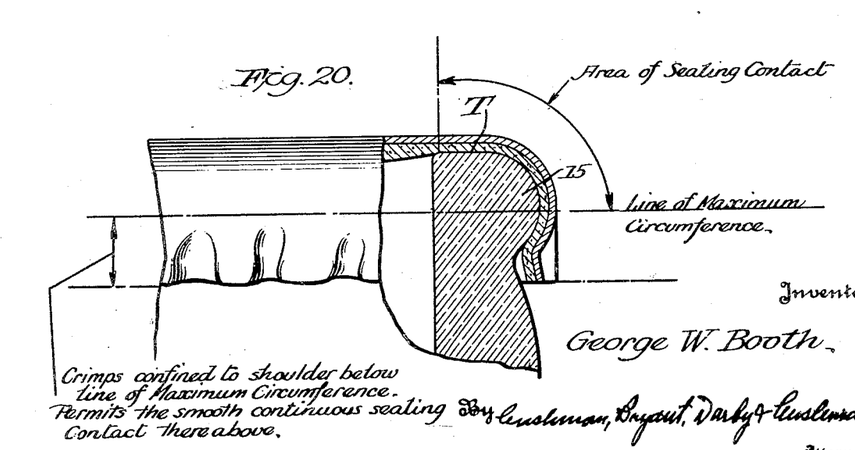
Figure 20 is a view similar to Figure 18 showing the cap of present application applied to a bottle having a conventional crown finish.

The closure in final position is best shown in Figures 3, 4 and 20. The applied closure is held in sealing engagement with the container by a freely buckled edge portion having a locking engagement with the shoulder beneath the bead 15 surrounding the mouth of the container. The irregular form of the crimps and the freely buckled characteristics of the metal are evident from an examination of the article, and these crimps are produced by the drawing of the metal as it is ironed over the top surface or lip of the bottle and the surrounding bead. This drawing action sets up stresses which cause the metal, along the edge of the disc, to buckle freely beneath the shoulder formed beneath bead 15.

Figure 18:
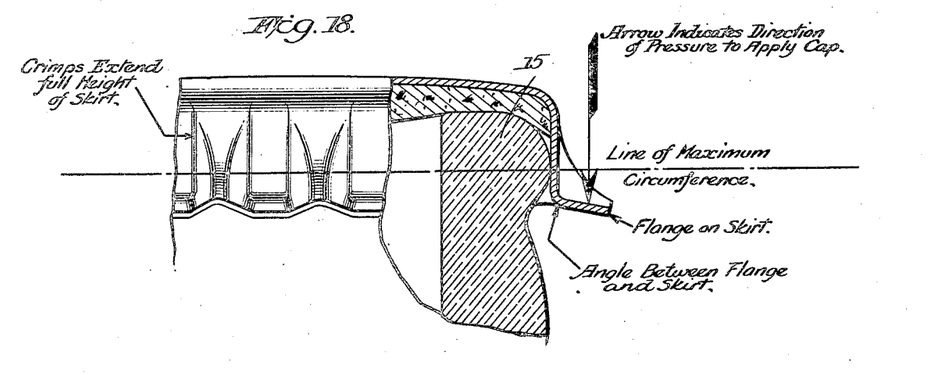
Figure 18 is a fragmentary view partly in section and partly in elevation showing a conventional crown cap during the course of application to a container having the usual crown finish.

The applied closure is also characterized by a very extended area of sealing contact. In other words, the cap has a sealing engagement with the container not only over the top surface or lip T of the container, but also over the surface of the bead 15 extending outwardly and downwardly from the top surface T to the line of maximum circumference (Figure 20). This sealing engagement is continuous, both axially and circumferentially, over the bead and, as will be observed, (Fig. 20), the freely buckled portion is confined below the line of maximum circumference of the container bead. Above this line or plane of greatest dimension of the locking bead the margin of the cap has a sealing contact produced by the ironing action which draws the metal outwardly and downwardly over the bead surface and finally results in the free buckling of the edge. The marked distinction between the irregularly and freely buckled edge portion, illustrated in Figures 4 and 20, and the uniformly and regularly crimped skirt of the conventional crown cap, will be evident upon a comparison of Figure 20 with Figure 19. In Figure 18, there is illustrated a conventional crown having the usual crimps which extend from substantially the top of the cap downwardly along the skirt and then outwardly along the flange. In applying the conventional crown, pressure is exerted on the flange in the direction indicated by the arrow (Fig. 18), and this pressure exerts a bending action on the flange which causes the inwardly extended corrugations or indentations at the angle between the flange and skirt to be pressed beneath the shoulder of the bottle finish to the position illustrated in Figure 19.

This bending action compresses the sealing disc of cushion material positioned within the crown, and results in an area of sealing contact which is confined to substantially the top or lip of the vessel, as contrasted with the extended area of sealing contact produced by my improved method and which characterizes my cap as applied to the container as illustrated in Figure 20.

Figure 19:
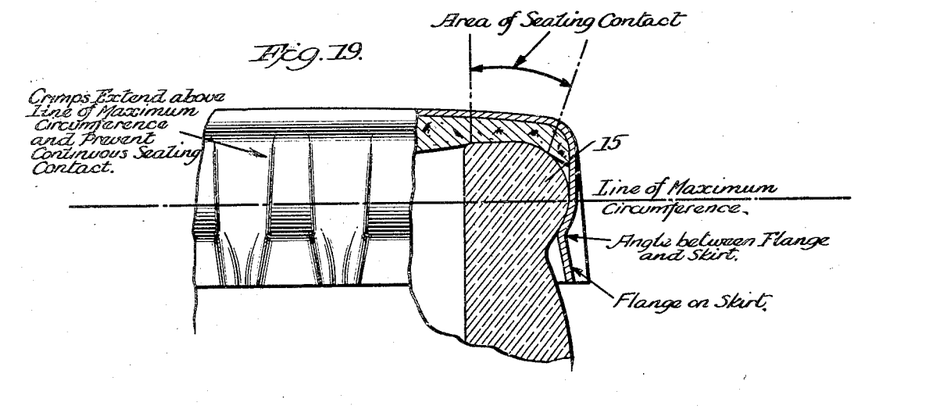
Figure 19 is a view similar to Figure 18 showing the position of the parts after application of the crown.

Moreover, in the conventional crown cap, as shown in Figures 18 and 19, the preformed corrugations are substantially coextensive with the skirt and flange. That is to say, they are not confined below the line of maximum circumference. Consequently, although there may be contact between the skirt and the bead of the container above the line of maximum circumference, this contact exists only at spaced points circumferentially of the bead, and, therefore, is not a sealing contact.

I am aware that it has heretofore been proposed to employ crown caps in which the skirt is substantially plain or uncorrugated; for example in the patent to Painter, No. 468,258, granted February 2, 1892. But in caps of the character shown in Figure 14 of this patent, for example, the skirt is preformed, and while there may result a contact between the skirt and the bead surface above the line of maximum circumference, this cannot be a sealing contact, due to the fact that there is no ironing and drawing action of the metal over the bead, the skirt having been preformed and merely fitted over the bead in frictional engagement therewith.

Moreover, the subsequent indenting of such a cap, as illustrated in Figure 15 of the Painter patent, for example, results in spacing of the cap skirt from the wall of the bead not only in the plane of the indentations, as illustrated in Figure 16 of said patent, but also upwardly above the line of indentations due to the natural tendency of the corrugations to extend upwardly when the skirt is pressed inwardly to form the corrugations. Such regularly indented or corrugated portions are distinguishable from the freely buckled edge of the present cap not only by the method of formation, but by their physical characteristics.

A closure of any given dimension may be applied by this method to containers which vary considerably in dimensions, and due to the fact that the skirt is formed by ironing pressure applied over the container surface, it will conform to irregularities in the bottle finish and provide a maximum area of sealing engagement.

Closures of this character may be stacked in suitable containers and being substantially flat and thin, a comparatively large number may be very compactly packed in stacked formation, which will enable them to be supplied in packaged form to the delivery chute of a capping machine. This permits sanitary packing and delivery of the closures and of use without removal of the same from the package as well as a saving of space in shipping and handling as compared to the usual skirt and closure. The stacked or tube form of packing instead of bulk backing which is customary in the shipment and handling of the usual skirted closure protects the caps against contamination which is of considerable importance when the same are used in the capping of milk or other liquids which must be maintained in sterilized condition.

Figure 16:
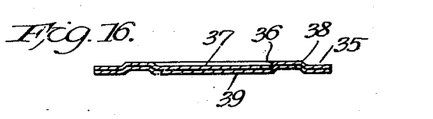
Figure 16 is an edge view of still another form.

Referring to Figure 16, there is shown a modified form of closure which inwardly from its marginal portion 35 is formed with a shoulder 36. The shoulder 36 is formed by deflecting the circular portion 37 of the body and there is formed between the shoulder 36 and an outwardly spaced shoulder 38 a channel adapted to receive the top surface of the lip. This channel or groove is comparatively shallow, and not only facilitates the centering of the cap upon the container, but facilitates the manufacture of the cap from a blank.

As will be understood, the ductile body is stamped from a sheet of faced ductile material, of suitable size to provide a number of closures, and it is desired after the stamping of the cap that the same be passed upwardly through the opening in the blank produced as a result of the formation of the cap. By forming the shoulder or channel, the area of the produced closure is less than the area of the opening and thus subsequent to the stamping operation of the cap, the latter may be passed upwardly through the opening and discharged, which is not possible in the production of caps of the form shown in Figures 13 and 14, inclusive.

It will be understood that, although the cap of Figure 16 is shown with only a single facing 39, the same may be provided with a facing on both surfaces, if desired. It has in common with the form of Figures 13 and 14 the flat marginal portion disposed substantially in the plane of the body of the disc and in production of both forms, the margin is retained in a plane paralleling the plane of the blank as distinguished from deflecting the margin to produce a skirted closure.

Figure 17:
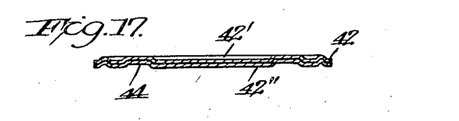
Figure 17 is an edge view of another modified form of closure.

In Figure 17, there is illustrated still another form which also has the substantially flat, i. e., uncrimped, margin 42 formed from a ply 42' of ductile material and a facing ply 42''.

By the term "flat", as used throughout the specification and claims in referring to the margin of the closure, is meant a margin which is not distorted along radial lines or uncrimped, as distinguished from the fluted or crimped margin of the conventional crown type of closure.

The margin in the present instance has a circular channel 43 which limits to some extent the length of the flutes or corrugations which are formed when the edge is buckled. The marginal portion is retained, as will be observed, in the plane of the body of the disc. Inwardly from the margin portion the cap is formed with a channel 44 which assists in centering the cap upon the container.

It will be understood that any of the above described forms of closures may be utilized in practicing this method and various other forms will suggest themselves to those skilled in the art, since the method is not limited to any particular form of closure.

Moreover, the various operating instrumentalities for practicing the method illustrated in Figures 1 to 3, inclusive, may be varied considerably; they may be hand-operated or embodied in a machine for effecting automatic or semi-automatic capping of containers.

In Figures 5 to 12, inclusive, I have shown a suitable mechanism adapted to be operated by hand. Although the same is described and claimed in my copending application, above identified, I will here briefly refer to this mechanism so that the invention will be more clearly understood.

The capping head is mounted for vertical reciprocation on a column 45, which is supported by a suitable base 46.

The parts are adapted to reciprocate in a sleeve 47 which is carried by an arm or boss 48 surrounding upright or column 45; the arm may be secured to the column at any desired elevation by means of a suitable clamp 49. Slidably mounted in the sleeve 47 is a tubular member 50 which is recessed at its upper end to provide a chamber for the spring 21. The chamber is closed at its outer end by a removable plug 52.

The stem or spindle 19 extends axially through the member 50, and the spring 21 surrounds this stem and at its ends bears against an abutment 53 on the stem and against the plug 52. The member 50 is enlarged below the sleeve 47 and within a recess or housing 28 formed in such enlarged portion is arranged the cap presser tool 20, which abuts, by ball and socket joint 54, the lower end of the stem 19. Within the recess at the lower end of the member 50 surrounding the presser tool 20 is the ironing and forming throat 22, formed of the several segmental strips 23 each having at its upper end the outwardly directed flange 24, the top bevelled surface 24' of which bears against the flat follower plate 26.

A supply hopper or container 55 for closures is arranged at one side of the bearing sleeve 47 and is supported from the tubular member 50 by a collar 56. The container 55 is adapted to receive a stack of closure blanks 57, and means are provided whereby said blanks are successively transferred from the bottom of said container to a position beneath the presser tool 20.

A base plate 58 at the lower end of the blank container 55 is provided with a guide for a slide 60 which includes a plate 61 adapted to reciprocate beneath the blank container 55 and having at one end a recess which conforms to the curvature of the vertical wall of the container, so that when the slide is at the limit of its movement in one direction (toward the left, Figures 6 and 7), the lowest blank in the container will be positioned on a plate 58a and within said recessed portion of the slide. The plate 58a is fitted in guides on the base plate and extends across an aperture formed in said base plate and through which the blanks in the receiver may be withdrawn when the plate is moved from the left from beneath said opening.

As the slide 60 is reciprocated, the blank positioned in the recessed end of the plate 61 will be moved to the right into position beneath the plunger or presser tool 20.

Figure 6:
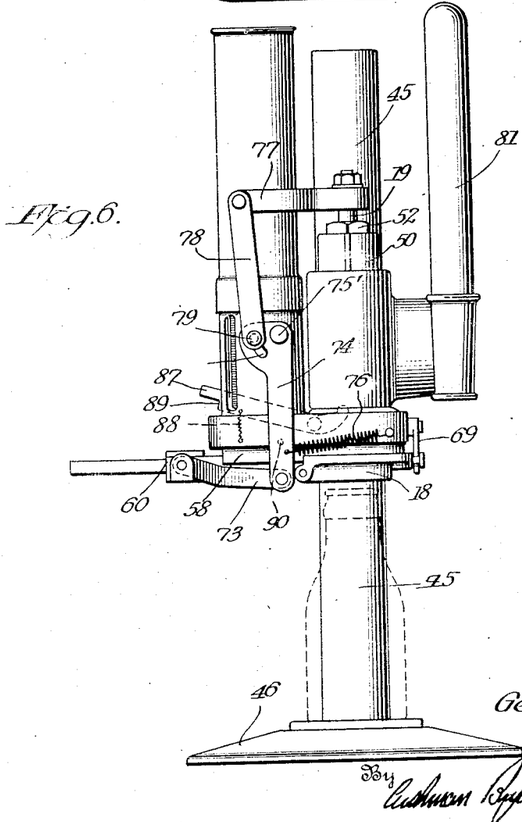
Figure 6 is an elevational view.
Figure 7:
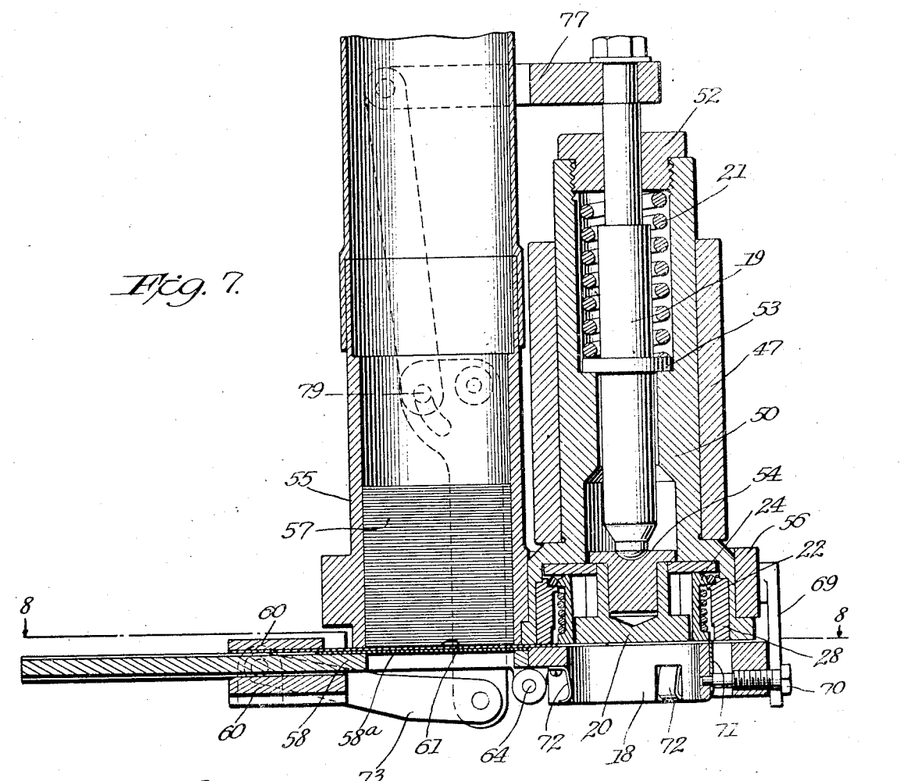
Figure 7 is a vertical sectional view through the cap forming and applying devices and the cooperating cap container.
Figure 8:
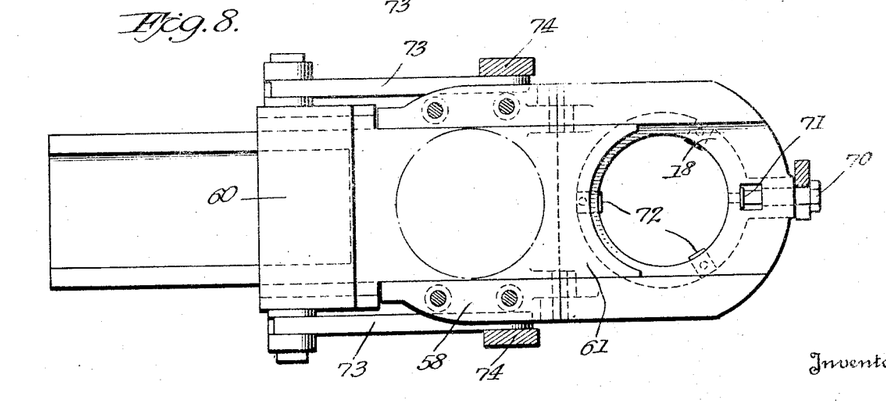
Figure 8 is a horizontal section on substantially the line 8—8 of Figure 7.
Figure 9:
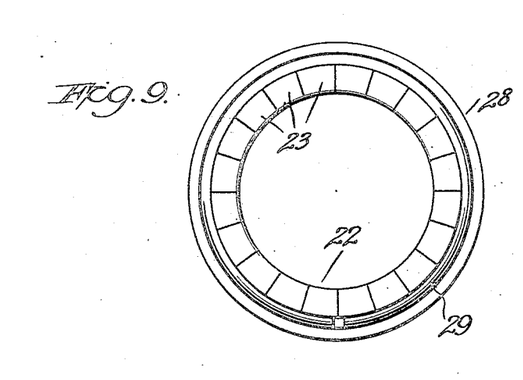
Figure 9 is a plan view of the throat portion of the cap shaping device.
Figure 10:
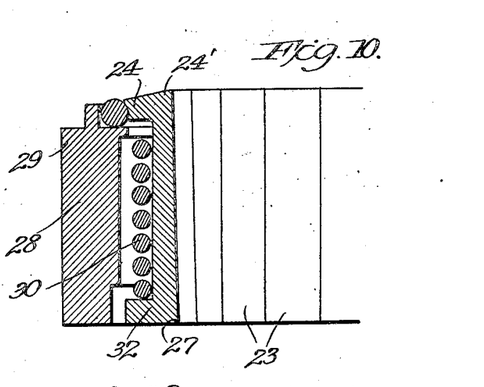
Figure 10 is a fragmentary sectional view of the forming throat.
Figure 11:
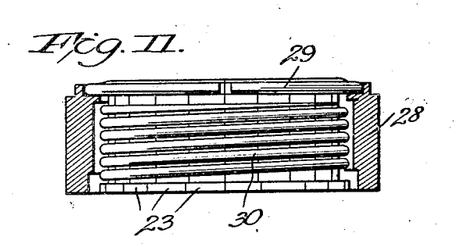
Figure 11 is a side elevational view of the throat showing the housing in cross section.

A bottle neck guide 18 is positioned beneath the presser tool 20, being hinged at 64 to the base 58 and is adapted to be held in the position shown in Figures 6 and 7 by a hook 69 engaging the projecting part of a screw extending from said bottle guide and cap support. As is shown, the screw 70 supports an abutment plate 71, which limits movement of the blank to the right and with which contacts the edge of the blank positioned beneath the presser tool 20 on the support 18.

The guide and support 18 includes a plurality of guide fingers 72 in the form of short leaf springs, which act to center a bottle neck introduced therein so that the bottle will be properly presented to the cap presser tool 20.

Reciprocation of the blank feeding plate is effected by links 73 connecting the slide 60 with the levers 74. The levers 74 are pivotally mounted at 75 on the container and are automatically rocked about the pivots 75' in one direction by a connection with the vertically reciprocable stem 19 and in the other direction by the action of a suitable spring 76. This connection with the stem 19 comprises a yoke 77, the arms of which are pivotally connected to links 78, each having adjacent its lower end a stud or pin 79 which extends into a slot 80 in the adjacent lever 74.

Vertical movement is imparted to the blank forming means toward the container, in the present form of apparatus, from a suitable handle or operating lever 81 connected to a shaft having bearings in the frame arm. Between the shaft and the tubular member 50 are interposed a suitable gear 83 and rack 84 (Figure 12) so that as the handle 81 is turned in one direction, the member 50 and parts connected thereto will be bodily moved downward and the neck of a container positioned on the base 46 will fit into the guide 18, and the mouth thereof brought into contact with a blank which has been properly positioned beneath the presser tool 20. Continued downward movement of the member 50 will cause the tool 20 to move upward relative to the tubular member 50, thereby compressing the spring 21 and the engagement of the expansible throat with the blank will iron or draw the ductile material of the latter so that the margin of the closure extends downward of the rim surrounding the bottle mouth.

The relative movement between the stem 19 and tubular member 50 will operate to swing the levers 74 to the left (Figure 6), withdrawing the body of slide plate 61 from beneath the container and permitting the lowermost blank to fall into position in the recessed end of the slide plate.

Figure 12:
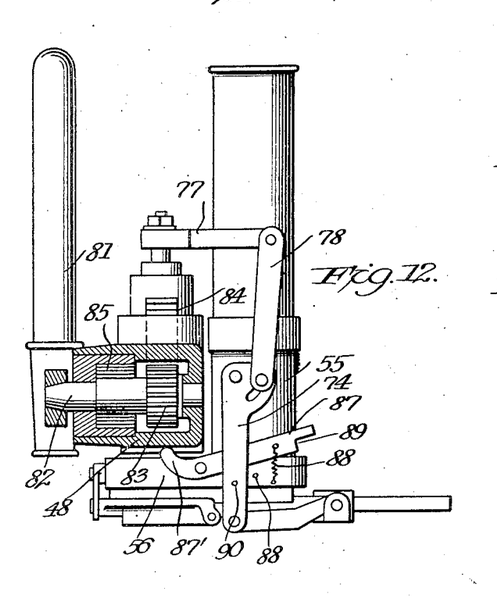
Figure 12 is a fragmentary side elevational view partly in section taken from the opposite side of the machine from that illustrated in Figure 6.

A lever 87 fulcrumed on the ring or base member 56 has one end 87' bearing against the lower surface of the stationary frame or boss member 48 so that when the parts are in the uppermost position, it is held in the relation shown in Figure 12.

As the capping head moves downward upon actuation of the lever 81 a spring 88 acts to depress the longer arm of said lever 87, the short arm being disengaged from the boss 48, and brings a shoulder 89 on the lever into the path of a stud 90 on one of the levers 74 when the latter is at the limit of its movement toward the right (Fig. 12). Downward movement of lever 87 is limited by a stud 88' on the collar 56. The blank feed slide is thus locked in position beneath the container.

On the next upward movement of the cap applying devices, the lever 87 is again rocked into the position shown in Figure 12 to permit the spring 76 to operate as before described to move the blank feed slide to the right (Figs. 6 and 7), and position another blank beneath the presser tool 20. This feed is permitted by the lifting of lever 87 upon re-engagement of it short end 87' with the arm or boss 48, as shown in Figure 12, the lever being carried into engagement with the boss by the upward movement of collar 56 on which it is pivoted.

When the operating lever is returned to its normal position, either manually or by the action of a suitable spring 85 (Figure 12), the spring 21 will act to restore the presser tool stem 19 to the position shown in Figure 7. During such return movement, the spring 76 will move the levers 74 to carry a cap to a position above the bottle guide 18, such movement being limited by the abutment plate 71.

The construction of the forming throat has been previously described, and as will be observed the presser tool 20 is circular in horizontal cross section, having a sliding fit within the forming throat. In the form of the invention shown, the lower face of the tool is flat throughout the area thereof.

The operation of applying a closure to a bottle by this mechanism is briefly as follows:

A container to be capped is supported on the base 46 below the plate 58 and substantially in axial alignment with the bottle neck guide and cap support 18. A plurality of closures having been previously positioned in the receiver, and the parts being in the position shown in Figure 7, a preliminary rocking of the operating lever will transfer the lowermost blank from alignment with the receiver into position beneath the presser tool 20, where it is supported by the combined bottle guide and support 18. Continued operation of the lever 81 will cause a downward movement of the tubular member 50, of the stem 19 and the presser tool 20. This movement will carry downward the plate 58, the blank container and the parts movable therewith. The guide 18 will operate to accurately center the mouth of the container in proper relation to the presser tool 20 and the bending throat.

Such downward movement will carry the closure, which is in alignment with the bending throat, against the mouth of the container and during the continued movement, the spring and tool 20 will maintain the desired sealing pressure between the closure and neck of the container.

This relative movement between the sealing head and container will act to form the depending skirt on the closure hereinbefore described, and the skirt will conform to the lip of the bottle throughout the top and side portions of the lip and provide an extended sealing area. The corrugated or fluted portions shown in Figure 4, are due solely to the forming action of the throat in drawing of the metal outwardly and downwardly from the top of the lip. The ductile material buckles automatically due to the uniform, downward and outward continued pressure, and due to the recessed area beneath the bead. The formation of these crimps about the closure is due solely to the tendency of the ductile material of the closure to buckle when being bent to the cup form. The number, spacing, and formation of the crimps varies with different closures, part of the material of the closure being moved inwardly and part outwardly.

The crimps are developed only along the edge of the closure, the action of the bending throat being to draw and form the marginal portion of the closure contacting with the container closely about and in engaging relation with the curved top and side of the bead or shoulder.

In the applying operation, the edge 27 of the bending throat performs substantially the entire drawing and ironing action, due to the fact that the opening within the throat enlarges in an upward direction, thereby preventing any extended engagement between the inner surfaces of the segments and the cap which would tend to weaken the locking engagement of the cap with the bottle finish. As before stated, the effect of the ironing action is to draw the metal under and above the surface directly engaged into close conformity with the container lip or surface 15. This drawing of the metal is produced by the ironing action and an important feature of the invention, therefore, is the ironing effect which takes place at or adjacent the plane of greatest diameter or maximum circumference of the container. At or adjacent this plane or area, the metal is ironed by the throat, thereby producing the drawing effect and this ironing action is continued sufficiently in a downward direction to cause the metal at the edge of the disc to buckle freely. Obviously, the radial width or area of the disc which is directly engaged may be varied as desired provided the drawing action mentioned is produced and provided further it is continued sufficiently to cause the free buckling described.

It will be understood that the bending throat does not engage beneath the bead of the bottle and is maintained out of engagement at all times with the crimped edge of the closure which interlocks with the inner surface of the bead or shoulder upon the container entirely because of the tendency of the cap to buckle after the ironing and drawing pressure has been carried a sufficient distance toward the edge of the cap.

While I have described the invention as applied to a hand machine and to a machine in which the cap and head move while the container is stationary, it will be understood that it is merely necessary that there be relative movement between the container and bending throat and that either or both may be moved either by hand or by power means.

Furthermore, while the method has been described in connection with a preferred mechanism and in connection with closures of preferred form, it will be understood that the method in its broader aspects is not dependent upon any particular mechanism or upon a closure of any particular form.

I claim:—

1. The improved method of capping a container having an external shoulder surrounding the container mouth which consists in positioning over the mouth a closure of ductile material having an uncrimped margin and of larger diameter than the container mouth and ironing the closure over the container lip by applying pressure inwardly from the edge of the closure uniformly around the container mouth and progressively continuing the same outwardly and downwardly sufficiently to cause the ductile material to buckle along the closure edge beneath the container shoulder.

2. The improved method of capping a container having an external shoulder surrounding the container mouth which consists in positioning over the mouth a closure of ductile material having an uncrimped margin and of larger diameter than the container mouth and ironing the closure over the container lip by applying pressure inwardly from the edge of the closure uniformly around the container lip and progressively continuing the same outwardly and downwardly sufficiently to cause the ductile material to buckle along the closure edge beneath the container shoulder, while maintaining the buckled portion along the closure edge free of ironing pressure.

3. The improved method of capping a container having an external shoulder surrounding the container mouth which consists in positioning over the mouth a substantially flat closure of ductile material and of larger diameter than the container mouth and ironing the closure over the container lip by applying pressure inwardly from the edge of the closure uniformly over the container lip and progressively continuing the same outwardly and downwardly sufficiently to cause the ductile material to buckle along the closure edge free of ironing pressure.

4. The improved method of capping a container having an external shoulder surrounding the container mouth which consists in positioning over the mouth a substantially flat closure of ductile material and of larger diameter than the container mouth and ironing the closure over the container lip by applying pressure inwardly from the edge of the closure uniformly over the container lip and progressively continuing the same outwardly and downwardly sufficiently to cause the ductile material to buckle along the closure edge free of ironing pressure, while maintaining the buckled portion along the closure edge free of ironing pressure.

5. The improved method of capping a container having an external shoulder surrounding the container mouth which consists in positioning over the mouth a closure of ductile material and of larger diameter than the container mouth, the closure having a marginal portion positioned in substantially the plane of the body thereof, supporting the closure along its edge, and, while supporting its edge, applying inwardly therefrom over the container lip an ironing pressure sufficient to bend the ductile material to conform to the lip, progressively continuing the ironing pressure outwardly toward the edge over the container lip sufficiently to cause the supported edge portion to be disengaged from its support and to buckle beneath the container closure.

6. The improved method of capping a container having an external shoulder surrounding the container mouth which consists in positioning over the mouth a closure of ductile material and of larger diameter than the container mouth, the closure having a marginal portion positioned in substantially the plane of the body thereof, supporting the closure along its edge, and while supporting its edge, applying inwardly therefrom over the container lip an ironing pressure sufficient to bend the ductile material to conform to the lip, progressively continuing the ironing pressure outwardly toward the edge over the container lip substantially uniformly around the mouth sufficiently to cause the supported edge portion to be disengaged from its support and to buckle beneath the container closure.

7. The improved method of capping a container having an external shoulder surrounding the container mouth which consists in positioning over the mouth a closure of ductile material and of larger diameter than the container mouth, the closure having a marginal portion positioned in substantially the plane of the body thereof, supporting the closure along its edge, and, while supporting its edge, applying inwardly therefrom over the container lip an ironing pressure outwardly toward the edge over the container lip sufficiently to cause the supported edge portion to be disengaged from its support and to buckle beneath the container closure, the said buckled edge portion beneath the shoulder being maintained free of ironing pressure.

8. The improved method of capping a container having an external shoulder surrounding the container mouth which consists in positioning over the mouth a closure of ductile material having a diameter larger than the container mouth, applying pressure to the closure inwardly from its edge over the container, and simultaneously ironing the closure over the lip inwardly from the edge of the closure and continuing the ironing pressure outwardly and downwardly toward the closure edge sufficiently to cause the ductile material to buckle along the closure edge beneath the container shoulder.

9. The improved method of capping a container having an external shoulder surrounding the container mouth which consists in positioning over the mouth a closure of ductile material having a diameter larger than the container mouth, the closure having a free edge portion disposed in substantially the plane of the body thereof, applying pressure to the closure inwardly from its edge over the container lip, and simultaneously ironing the closure over the lip inwardly from the edge of the closure and continuing the ironing pressure outwardly and downwardly toward the closure edge sufficiently to cause the ductile material to buckle along the closure edge beneath the container shoulder.

10. The improved method of capping a container having an external shoulder surrounding the container mouth which consists in positioning over the mouth a closure of ductile material having a diameter larger than the container mouth, applying pressure to the closure inwardly from its edge over the container lip, and simultaneously ironing the closure over the lip inwardly from the edge of the closure substantially around the mouth and continuing the uniformly around the mouth and continuing the ironing pressure outwardly and downwardly toward the closure edge sufficiently to cause the ductile material to buckle along the closure edge beneath the container shoulder.

11. The improved method of capping a container having an external shoulder surrounding the container mouth which consists in positioning over the mouth a closure of ductile material having a diameter larger than the container mouth, applying pressure to the closure inwardly from its edge over the container lip, and simultaneously ironing the closure over the lip inwardly from the edge of the closure and continuing the ironing pressure outwardly and downwardly toward the closure edge sufficiently to cause the ductile material to buckle along the closure edge beneath the container shoulder, while maintaining the buckled portion beneath the shoulder free of ironing pressure.

12. The improved method of capping a container having an external shoulder surrounding the container mouth which consists in positioning over the mouth a closure of ductile material having a diameter larger than the container mouth, the closure having a free edge portion disposed in substantially the plane of the body thereof, applying pressure to the closure inwardly from its edge over the container lip, and simultaneously ironing the closure over the lip inwardly from the edge of the closure substantially uniformly around the mouth and continuing the ironing pressure outwardly and downwardly toward the closure edge sufficiently to cause the ductile material to buckle along the closure edge beneath the container shoulder.

13. The improved method of capping a container having an external shoulder surrounding the container mouth which consists in positioning over the mouth a closure of ductile material having a diameter larger than the container mouth, the closure having a free edge portion disposed in substantially the plane of the body thereof, applying pressure to the closure inwardly from its edge over the container lip, and simultaneously ironing the closure over the lip inwardly from the edge of the closure and continuing the ironing pressure outwardly and downwardly toward the closure edge sufficiently to cause the ductile material to buckle along the closure edge beneath the container shoulder, while maintaining the buckled portion beneath the shoulder free of ironing pressure.

14. The improved method of capping a container having an exernal shoulder surrounding the container mouth which consists in positioning over the mouth a closure of ductile material having a diameter larger than the container mouth, the closure having a free edge portion disposed in substantially the plane of the body thereof, applying pressure to the closure inwardly from its edge over the container lip, and simultaneously ironing the closure over the lip inwardly from the edge of the closure substantially uniformly around the mouth and continuing the ironing pressure outwardly and downwardly toward the closure edge sufficiently to cause the ductile material to buckle along the closure edge beneath the container shoulder, while maintaining the buckled portion beneath the shoulder free of ironing pressure.

15. The improved method of capping a container having an external shoulder surrounding the container mouth which consists in positioning over the mouth a substantially flat closure of ductile material having a diameter larger than the container mouth, applying pressure to the closure inwardly from its edge to effect a sealing engagement with the container lip and simultaneously both supporting the free edge of the closure and ironing the closure over the container lip by direct application of ironing pressure over the lip and continuing the ironing pressure outwardly and downwardly over the lip toward the edge of the closure sufficiently to cause the ductile material to buckle along the closure edge beneath the container closure.

16. The improved method of capping a container having an external shoulder surrounding the container mouth which consists in positioning over the mouth a substantially flat closure of ductile material having a diameter larger than the container mouth, applying pressure to the closure inwardly from its edge to effect a sealing engagement with the container lip and simultaneously both supporting the free edge of the closure and ironing the closure over the container lip by direct application of ironing pressure over the lip substantially uniformly around the mouth and continuing the ironing pressure outwardly and downwardly over the lip toward the edge of the closure sufficiently to cause the ductile material to buckle along the closure edge beneath the container closure.

17. The improved method of capping a container having an external shoulder surrounding the container mouth which consists in positioning over the mouth a substantially flat closure of ductile material having a diameter larger than the container mouth, applying pressure to the closure inwardly from its edge to effect a sealing engagement with the container lip and simultaneously both supporting the free edge of the closure and ironing the closure over the container lip by direct application of ironing pressure over the lip and continuing the ironing pressure outwardly and downwardly over the lip toward the edge of the closure sufficiently to cause the ductile material to buckle along the closure edge beneath the container closure, while maintaining the buckled edge portion beneath the shoulder free of ironing pressure.

18. The improved method of capping a container having an external shoulder surrounding the container mouth which consists in positioning over the mouth a substantially flat closure of ductile material having a diameter larger than the container mouth, applying pressure to the closure inwardly from its edge to effect a sealing engagement with the container lip and simultaneously both supporting the free edge of the closure and ironing the closure over the container lip by direct application of ironing pressure over the lip substantially uniformly around the mouth and continuing the ironing pressure outwardly and downwardly over the lip toward the edge of the closure sufficiently to cause the ductile material to buckle along the closure edge beneath the container closure, while maintaining the buckled edge portion beneath the shoulder free of ironing pressure.

19. The improved method of capping a container having an external shoulder surrounding the container mouth which consists in positioning over the mouth a closure of ductile material and of larger area than the overall area of the container mouth and causing the margin of the closure to buckle beneath the container shoulder by ironing the closure over the container lip inwardly from its buckled edge.

20. The improved method of capping a container having an external shoulder surrounding the container mouth which consists in positioning over the mouth a closure of ductile material having a flat margin, the closure being of larger area than the overall area of the container mouth, and causing the margin of the closure to buckle beneath the container shoulder by ironing the closure over the container lip inwardly from its buckled edge.

21. In combination with an open mouthed container having around its mouth an external bead, a cap positioned over the container mouth to close the same and comprising a shell of ductile material, said shell having a skirt smoothly ironed over the bead surface downwardly to the line of maximum circumference of the bead, the skirt having a marginal portion below said line of maximum circumference self-buckled into engagement with the bead below said line to lock the cap on the container.

22. In combination with an open mouthed container having around its mouth an external bead, a cap comprising a shell of ductile material having a liner of relatively compressible material therein, said cap being positioned over the container mouth with the liner in contact with the bead, said shell having a skirt smoothly ironed over the bead surface downwardly to the line of maximum circumference of the bead with the liner compressed between the shell and bead from the top of the latter to said line of maximum circumference, the skirt maintaining a locking engagement with the bead by a self-buckled portion engaged below said line of maximum circumference.

23. In combination with an open mouthed container having around its mouth an external bead, a cap positioned over the container mouth to close the same and comprising a shell of ductile material, said shell having a skirt smoothly ironed over the external bead surface from the top of the bead down to the line of maximum circumference of the bead, the skirt having a freely buckled marginal portion below said line of maximum circumference characterized by circumferentially irregular crimps of substantially uniform height engaged with the bead below said line to lock the cap on the container.

24. In combination with an open mouthed container having around its mouth an external bead, a cap comprising a shell of ductile material having a liner of relatively compressible material therein, said cap being positioned over the container mouth with the liner in contact with the bead, said shell having a skirt smoothly ironed over the bead surface downwardly to the line of maximum circumference of the bead with the liner compressed between the shell and bead from the top of the latter to said line of maximum circumference, the skirt maintaining a locking engagement with the bead by a freely buckled portion engaged below said line of maximum circumference, said freely buckled portion being characterized by crimps non-uniform in the circumferential direction but of substantially uniform height.

25. The combination with an open mouthed container having around its mouth an external bead presenting a lower circumferential shoulder, a closure for said mouth comprising a shell of ductile material, said shell having its marginal portion ironed over and around said bead from substantially flat disc form to conform it smoothly with the bead from the top of the latter down to the top of said shoulder, the extreme marginal portion of the shell, due to the extension of the ductile material by ironing, being constricted to form crimps engaged under the shoulder and locking the closure on the container.

26. The combination with an open mouthed container having around its mouth an external bead presenting a lower circumferential shoulder, a closure of ductile material for said mouth, said closure having its marginal portion ironed over and around said bead from substantially flat disc form to conform it smoothly with the bead from the top of the latter down to the top of said shoulder, the extreme marginal portion of the closure, due to the extension of the ductile material by ironing, being constricted to form circumferentially irregular crimps engaged under the shoulder and locking the closure on the container.

27. In combination with an open mouthed container having around its mouth an external bead presenting a lower circumferential shoulder, a closure for the container mouth comprising a shell of ductile material and a liner of relatively compressible material in the shell, said shell having its marginal portion ironed over and around said bead from substantially flat disc form to conform it smoothly with the bead from the top of the latter down to the top of said shoulder whereby the liner is compressed against the bead surface from the top of the bead to the top of said shoulder, the extreme marginal portion of the shell, due to the extension of the ductile material by ironing, being constricted to form crimps engaged under the shoulder and locking the closure on the container.

28. In combination with an open mouthed container having around its mouth an external bead presenting a lower circumferential shoulder, a closure for the container mouth comprising a shell of ductile material and a liner of relatively compressible material in the shell, said shell having its marginal portion ironed over and around said bead from substantially flat disc form to conform it smoothly with the bead from the top of the latter down to the top of said shoulder whereby the liner is compressed against the bead surface from the top of the bead to the top of said shoulder, the extreme marginal portion of the shell, due to the extension of the ductile material by ironing, being constricted to form circumferentially irregular crimps engaged under the shoulder and locking the closure on the container.

29. The improved method of capping a container having an external bead surrounding the container mouth, which consists in positioning over the mouth a closure of ductile material and of larger area than the container mouth and causing the ductile material to conform smoothly to the external surface of the bead and the margin of the closure to buckle beneath the container bead by ironing the closure over the bead surface at a point located downwardly from the top of the bead.

30. The improved method of capping a container having an external bead surrounding the container mouth which progressively increases in diameter outwardly and downwardly from the top surface of the container, which consists in positioning over the mouth a closure of ductile material and of larger area than the overall area of the container mouth and causing the ductile material to conform smoothly to the surface of the bead and the margin of the closure to buckle beneath the container bead by ironing the closure over the bead surface at a point located downwardly from the top of the bead surface and adjacent the plane of maximum circumference of the bead.

31. In combination with an open mouthed container having around its mouth an external bead, a cap positioned over and closing the container mouth and comprising a shell of ductile material, said shell having a skirt smoothly ironed over the bead surface below its top surface, the skirt having a marginal portion below said ironed portion self-buckled into engagement with the bead to lock the cap on the container.

32. In combination with an open mouthed container having around its mouth an external bead which increases in diameter outwardly and downwardly from the top surface of the container, a cap positioned over and closing the container mouth and comprising a shell of ductile material, said shell having a skirt smoothly ironed over the bead surface at or adjacent the plane of maximum circumference of the bead and below the top surface of the bead, the skirt having a marginal portion below said ironed portion self-buckled into engagement with the bead to lock the cap on the container.

GEORGE W. BOOTH.